(12) United States Patent
Atkins

(10) Patent No.: US 9,348,082 B2
(45) Date of Patent: May 24, 2016

(54) ILLUMINATOR FOR REFLECTIVE DISPLAYS

(75) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 327 days.

(21) Appl. No.: 14/003,125

(22) PCT Filed: Mar. 7, 2012

(86) PCT No.: PCT/US2012/028128
§ 371 (c)(1),
(2), (4) Date: Sep. 4, 2013

(87) PCT Pub. No.: WO2012/122306
PCT Pub. Date: Sep. 13, 2012

(65) Prior Publication Data
US 2013/0334972 A1 Dec. 19, 2013

Related U.S. Application Data

(60) Provisional application No. 61/450,580, filed on Mar. 8, 2011.

(51) Int. Cl.
*H05B 37/02* (2006.01)
*F21V 8/00* (2006.01)
(52) U.S. Cl.
CPC ............ *G02B 6/0035* (2013.01); *G02B 6/0036* (2013.01); *H05B 37/0218* (2013.01); *G02B 6/0061* (2013.01)
(58) Field of Classification Search
CPC .......................... G02B 6/0035; H05B 37/0218

USPC .......... 315/151; 362/608, 620, 603, 626, 559, 362/561, 601, 625, 617, 615
See application file for complete search history.

(56) References Cited

U.S. PATENT DOCUMENTS

| 5,779,338 A * | 7/1998 | Ishikawa ............. G02B 6/0025 |
| | | 362/23.16 |
| 6,376,828 B1 * | 4/2002 | Comiskey ............ G02B 6/0028 |
| | | 250/216 |

(Continued)

FOREIGN PATENT DOCUMENTS

| CN | 1823430 | 8/2006 |
| CN | 101126859 | 2/2008 |

(Continued)

*Primary Examiner* — Lincoln Donovan
*Assistant Examiner* — Thomas Skibinski

(57) ABSTRACT

An illuminator for a reflective display (10) incorporates a light guide (14) having substantially transparent front and rear planar surfaces which overlap the display's viewing surface when the surfaces are substantially parallel and adjacent to the viewing surface. A light source (16) emits light into the light guide. A plurality of light redirecting structures (30) is distributed on the light guide's rear surface. The structures are shaped to redirect through the light guide toward the viewing surface light rays which encounter the structures. Most light rays emitted into the light guide by the light source which do not encounter any of the structures are confined within the light guide by total internal reflection. Most light rays emitted into the light guide by the light source which encounter any of the structures are re directed through the light guide toward the viewing surface, substantially uniformly illuminating the display in a low ambient light environment.

23 Claims, 1 Drawing Sheet

(56) References Cited

U.S. PATENT DOCUMENTS

| | | | |
|---|---|---|---|
| 6,646,636 B1 * | 11/2003 | Popovich | G02B 5/32 345/102 |
| 7,163,332 B2 | 1/2007 | Shimizu | |
| 7,733,439 B2 | 6/2010 | Sampsell | |
| 2003/0206408 A1 * | 11/2003 | Funamoto | G02B 6/0036 362/603 |
| 2006/0290684 A1 | 12/2006 | Giraldo | |
| 2008/0018575 A1 | 1/2008 | Kobayashi | |
| 2009/0135469 A1 | 5/2009 | Lee | |
| 2010/0002466 A1 * | 1/2010 | Kim | G02B 6/003 362/615 |
| 2010/0033828 A1 * | 2/2010 | Lee | G02B 27/1086 359/618 |
| 2010/0187422 A1 | 7/2010 | Kothari | |

FOREIGN PATENT DOCUMENTS

| | | |
|---|---|---|
| CN | 101542191 | 9/2009 |
| EP | 1341009 | 9/2003 |
| EP | 2187247 | 5/2010 |
| JP | 11-007012 | 1/1999 |
| JP | 11-167111 | 6/1999 |
| JP | 2003-107474 | 4/2003 |
| WO | 01/02772 | 1/2001 |
| WO | 2005/001012 | 2/2005 |

* cited by examiner

ILLUMINATOR FOR REFLECTIVE DISPLAYS

CROSS-REFERENCE TO RELATED APPLICATIONS

This application claims priority to U.S. Provisional Patent Application No. 61/450,580 filed 8 Mar. 2011, which is incorporated herein by reference in its entirety.

TECHNICAL FIELD

A light guide incorporating optical features provides auxiliary illumination for a reflective display, facilitating use of the display in low ambient light conditions.

BACKGROUND

Unlike a backlit display having an internal light source (e.g. one or more light sources mounted inside the display), a reflective display utilizes an external light source (e.g. the sun, a room's overhead electric lighting, a table lamp, etc.) in order to illuminate the display. Ambient light emanating from the external light source(s) is reflected by the display back toward the display's user. Reflective displays are typically more efficient than backlit displays, in the sense that reflective displays do not consume power in order to energize an internal light source.

Reflective displays require ambient light in order to be visible and thus are not well suited to use in low ambient light (i.e. dim or dark) environments such as a home theatre, airplane, etc. Moreover, the illumination intensity (i.e. brightness) of a reflective display is limited by the intensity of the ambient light which is incident upon the display. In some situations it is desirable for the illumination intensity of a reflective display to exceed the illumination intensity of the ambient light incident on the display, for example to facilitate use of the display in a low ambient light environment. Such situations are addressed below.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 2:
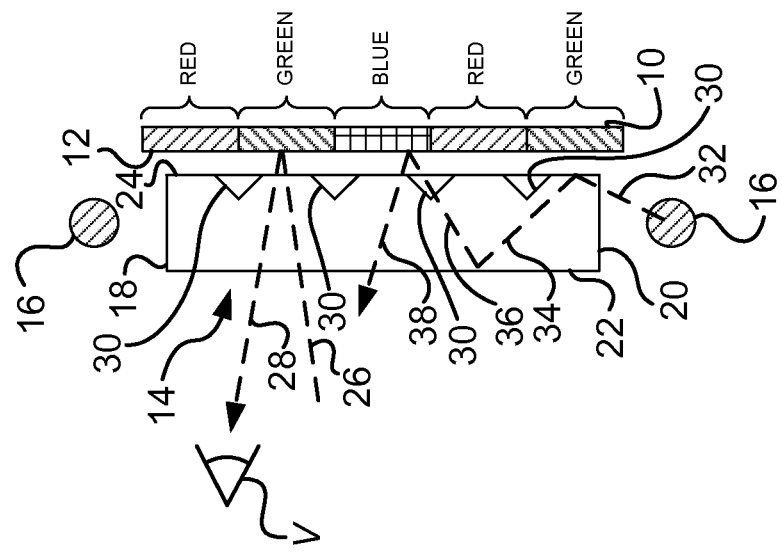
FIG. 2 is a not-to-scale, schematic, side elevation view of the FIG. 1 apparatus.
Figure 1:
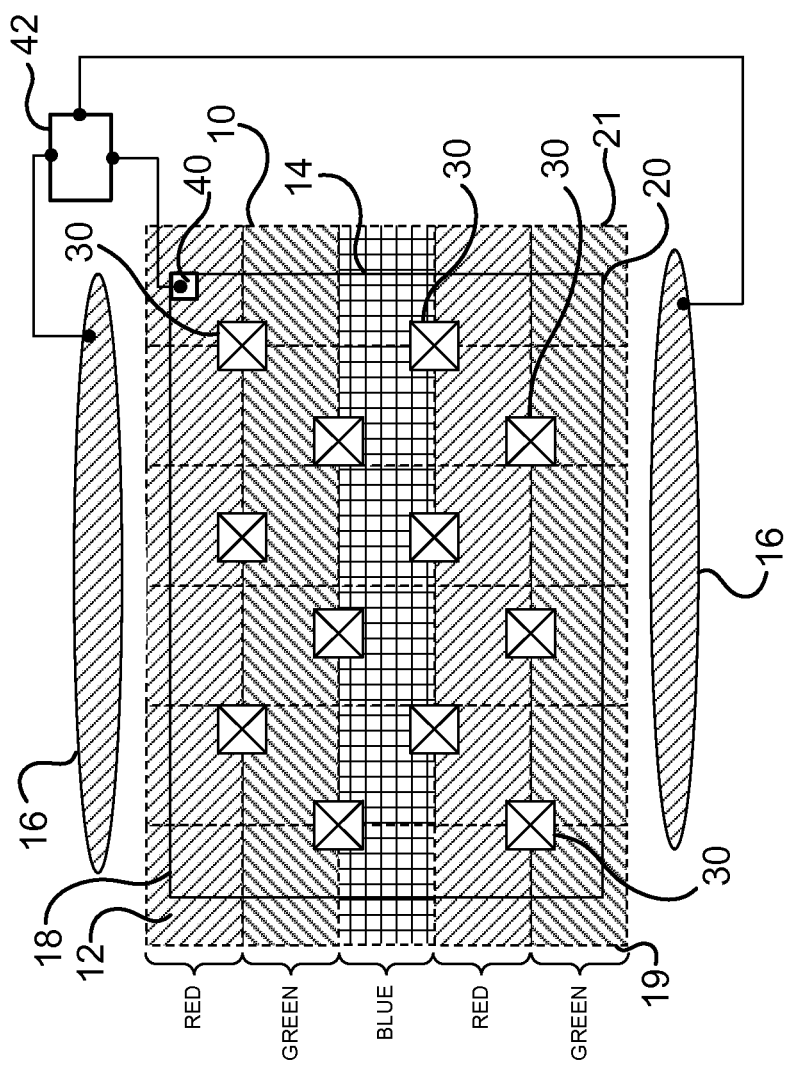
FIG. 1 is a not-to-scale, schematic, front elevation view looking into the outward viewing surface of a reflective display having an illuminator.

FIGS. 1 and 2 depict a reflective display 10 having an outward viewing surface 12 through which ambient light rays emitted by an external ambient light source (not shown) pass to illuminate display 10 during conventional operation of display 10.

A light guide 14 is fixed to, mounted on or otherwise placed over display 10's outward viewing surface 12. Light guide 14 may be a thin, flat sheet formed of glass or a clear plastic material such as polycarbonate. One or more light sources 16 are optically coupled to light guide 14, such that light emitted by each source 16 is directed through a corresponding edge 18 or 20 of light guide 14. Light rays emitted into light guide 14 by light sources 16 are ordinarily confined within light guide 14 by total internal reflection. Light sources 16 may be light emitting diode (LED), organic light emitting diode (OLED), cold cathode fluorescent lamp (CCFL) or other suitable light sources.

Light guide 14's front and rear planar surfaces 22, 24 (i.e. the surfaces of light guide 14 which are substantially parallel to and overlap substantially all of display 10's outward viewing surface 12) are substantially transparent to incident light rays, such as ambient light ray 26 which passes through light guide 14 and is reflected by display 10 back through light guide 14 toward viewer V as light ray 28. Accordingly, light guide 14 does not significantly impair conventional operation of reflective display 10. Light guide 14 may be formed of a solid dielectric material, or may be hollow.

The edges of light guide 14 are internally reflective so that light rays which encounter an edge of light guide 14 are reflected back into light guide 14 instead of escaping from light guide 14 and consequently being "lost". This may for example be achieved by coating edges 14 with a reflective material such as aluminium or Mylar™ film. In the depicted embodiment of display 10, no light sources are optically coupled to direct light through either of one of edges 19, 21 of light guide 14. Edges 19, 21 are accordingly internally reflective as aforesaid. Edges 18, 20 to which light sources 16 are optically coupled as aforesaid are partially reflective, it being recognized that light emitted by light sources 16 must be able to pass through edges 18, 20 when light sources 16 are activated as explained below. Light sources 16 may also be provided with reflective surrounds in order to reflect stray light rays back into light guide 14.

A plurality of light redirecting structures 30 are provided or formed within light guide 14. Structures 30 may be formed of a material such as glass or a clear plastic material such as polycarbonate. The refractive index of the material used to form structures 30 should differ from the refractive index of the material used to form light guide 14. In some cases no separate material need be supplied to form structures 30, e.g. structures 30 may be formed by removing material from light guide 14 by drilling, machining, impressing, roughening etc. in which case structures 30 will be a plurality of air-filled pockets—it being recognized that air has a refractive index which differs from the refractive index of the material used to form light guide 14.

Alternatively, structures 30 may be formed of a material other than air. For example, structures 30 may be initially formed as a sheet, followed by formation of light guide 14 around the sheet, e.g. by pouring a liquid light guide formation material over the sheet, then containing and cooling the liquid until it solidifies in the desired form of light guide 14. As a further alternative, a solid light guide formation material may be softened, e.g. by heating the material. Structures 30 may then be pressed-formed into the softened light guide formation material, which is then allowed to cool.

Each structure 30 protrudes into light guide 14 from light guide 14's rear surface 24. Structures 30 cumulatively occupy a relatively small fraction (typically less than 10%) of the total surface area of light guide 14's rear surface 24. Accordingly, most ambient light rays incident on light guide 14's front surface 22 (e.g. the aforementioned incident ray 26) pass through light guide 14 without being affected by structures 30, and are reflected by display 10 (e.g. the aforementioned reflected ray 28) back through light guide 14 toward viewer V, again without being affected by structures 30. Accordingly, structures 30 do not significantly impair conventional operation of reflective display 10. Structures 30 may have various shapes including prismatic, semi-spherical, a mixture thereof including approximations of prismatic and semi-spherical shapes, or other shapes capable of redirecting light rays as explained below. Structures 30 are similarly but not necessarily identically sized.

If display 10 is to be used in a low ambient light environment then light sources 16 are activated (i.e. turned on). Light rays emitted into light guide 14 by light sources 16 are ordinarily confined within light guide 14 by total internal reflection, e.g. rays 32 and 34. However, structures 30 disrupt light guide 14's total internal reflection characteristic. For example, a light ray such as ray 36 which encounters one of structures 30 is reflected or refracted (i.e. redirected) through structure 30 and through light guide 14's rear surface 24 toward display 10. Display 10 then reflects the ray (e.g. reflected ray 38) back through light guide 14 toward viewer V. Accordingly, light sources 16, in combination with structures 30, provide an overall uniform field of illumination through light guide 14's front surface 22. The intensity of light sources 16, which may be user-variable (or automatically varied as explained below), determines the intensity of images appearing in display 10.

The total number of structures 30, the size (i.e. the cross-sectional area of each one of structures 30 in a plane substantially parallel to light guide 14's rear surface 24), and the separation distance (i.e. distribution density) between adjacent ones of structures 30, are selected to attain reasonably uniform illumination of display 10 and to prevent noticeable visibility of structures 30, such that structures 30 are substantially imperceptible to user V during operation of display 10 whether light sources 16 are activated or deactivated. For example, in some embodiments, the total number of structures 30 may be about 1 to 4 times the total number of display sub-pixels in display 10, and the size of each one of structures 30 may be about 10% to 2.5% the area of each display sub-pixel.

As shown in FIGS. 1 and 2, display 10 may have sequentially alternating rows of red, green and blue sub-pixels, with each sub-pixel corresponding to one of the hatched rectangles shown in FIG. 1. For example, FIG. 1 depicts an uppermost row of six red sub-pixels, an adjacent row of six green sub-pixels, etc. A pixel is composed of several sub-pixels which together form a particular color perceptible on display 10's outward viewing surface 12. In one embodiment, at least one of structures 30 is provided per pixel or sub-pixel. Different reflective displays may have different sub-pixel structures, and need not be arrayed side-by-side as shown in FIG. 1. As one example, each pixel may be correspond to cyan, yellow, magenta sub-pixels stacked atop one other. Structures 30 may be uniformly spaced apart from one another as shown in FIG. 1, or their spacing may be non-uniform.

Structures 30 also facilitate detection of the intensity of the ambient light incident on display 10, automated activation of light sources 16 if the ambient light intensity is less than a predetermined threshold intensity value, and automated variation of the illumination intensity of light sources 16 in response to changes in the illumination intensity of the ambient light incident on display 10. Although many of the light rays which encounter one of structures 30 are redirected through structure 30 onto display 10 as previously described in relation to ray 36, a small fraction of the incident ambient light rays are scattered by structures 30 without being redirected as aforesaid. Some such scattered light rays are transmitted along light guide 14 by total internal reflection and eventually encounter one of the edges of light guide 14. One or more optical sensors 40 (shown only in FIG. 1) such as photodiodes, charge coupled device (CCD) or complementary metal oxide semiconductor (CMOS) sensors may be provided at one or more of the edges of light guide 14, to produce an output signal having a value representative of the intensity of the light rays which encounter sensor(s) 40.

A controller 42 (shown only in FIG. 1) such as a microprocessor, field-programmable gate array (FPGA), application-specific integrated circuit (ASIC), central processing unit (CPU) or graphics processing unit (GPU) can be electronically coupled between sensor(s) 40 and light sources 16. Controller 42 can be configured to compare the value of the output signal produced by sensor(s) 40 with one or more predefined values respectively representative of one or more corresponding ambient light intensity thresholds, and to activate (i.e. turn on) light sources 16 if the ambient light intensity is determined to be less than a predetermined ambient light intensity threshold value, or to deactivate (i.e. turn off) light sources 16 if the ambient light intensity is determined to exceed a predetermined ambient light intensity threshold value. Controller 42 can also be configured to vary (i.e. increase or decrease) the illumination intensity of light sources 16 in response to different ambient light intensity values detected by sensor(s) 40, such that user V perceives substantially uniform illumination of display 10 notwithstanding changes in the intensity of the ambient light incident on display 10, and notwithstanding activation, intensity-increased activation, intensity-decreased activation, or deactivation of light sources 16 by controller 42 in response to such changes.

The intensity of the ambient light illumination may also or alternatively be detected at different regions of display 10, and light sources 16 may then be selectively activated to provide suitably compensating (and possibly different) supplemental illumination for each region. For example, one region of display 10 may be more brightly illuminated by ambient light than another region, in which case controller 42 may selectively activate light sources 16 to even out the illumination in each region so as to attain overall uniform illumination of display 10's outward viewing surface 12.

In some embodiments, it may be desirable to have light sources 16, in combination with structures 30, provide an overall non-uniform field of illumination through light guide 14's front surface 22. For example, it may be desirable to illuminate only one or more selected areas of display 10, e.g. to enable local-lighting comparable to LCD edge lighting with a local dimming capability. Thus, light sources 16 may be selectably activated to provide only such additional illumination as may be required to supplement the available ambient light so as to yield a desired illumination intensity over light guide 14's front surface 22, or over one or more selected regions of light guide 14's front surface 22. Light sources 16 may also be selectably activated to provide such additional illumination as may be required to supplement the available ambient light so as to yield a desired illumination intensity corresponding to a predefined illumination intensity in order to simulate a particular light field.

It may also or alternatively be desirable to adjust the illumination intensity of display 10 in accordance with one or more predefined characterizations of different light conditions, each predefined condition having an ambient light component corresponding to a particular ambient light environment and an artificial light component corresponding to light contributed by light sources 16.

Sensors 40 can also be used to detect the chromaticity of the ambient light environment, which can in turn be used to adjust light sources 16 to emit light of the same or similar chromaticity. For example, if display 10 is viewed in a dim daylight ambient light environment, it may be desirable to activate light sources 16 such that they emit light having a similar daylight color. Alternatively, if display 10 is viewed in a candle-lit, fire-lit, or tungsten-lit ambient light environment, it may be desirable to activate light sources 16 such that they emit light having a color similar to that of the candle-lit, fire-lit, or tungsten-lit environment respectively.

In some embodiments, light sources 16 may comprise a linear array of controllable light elements extending along one of light guide 14's edges 18 or 20. Each such element can be individually controlled to provide uneven illumination across light guide 14's front surface 22 (i.e. illumination which varies in intensity adjacent different ones of the controllable light elements). This facilitates display of higher dynamic range images, color gamut extension, and reduced power consumption.

For example, if the illumination intensity (i.e. brightness) on one side of display 10 is greater than the illumination intensity on an opposed side of display 10, the contrast of display 10 is effectively increased, yielding a higher dynamic range image display capability.

As an example of color gamut extension, if one portion of a displayed image is of a predominant color (e.g. an image portion depicting a predominantly blue sky) then the controllable light elements which are primarily responsible for illuminating the region of light guide 14's front surface 22 on which that image portion is displayed can be controllably adjusted to produce predominantly blue colored light. This extends display 10's color gamut beyond the gamut attainable if only ambient light or white light is used to illuminate display 10. The controllable light elements can be arranged so that individual elements, or groups of elements (i.e. white elements or groups of red, green and blue elements) are selectably used to illuminate different regions of light guide 14's front surface 22.

As an example of reduced power consumption, the controllable light elements can be dimmed on one side of light guide 14's front surface 22.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A display, comprising an illuminator, the illuminator comprising:
    a light guide having substantially transparent front and rear planar surfaces sized to overlap a viewing surface of the display when the planar surfaces are substantially parallel and adjacent to the viewing surface;
    a light source optically coupled to emit light into the light guide, the light source having an adjustable chromaticity;
    a plurality of light redirecting structures distributed on the rear surface of the light guide, each one of the structures shaped to redirect through the light guide toward the viewing surface light rays which encounter the structures;
    an optical sensor having an output operable to provide an output signal representative of a chromaticity of ambient light; and
    a controller configured to adjust the chromaticity of the light source in response to the output signal of the optical sensor;
    wherein:
        most light rays which are emitted into the light guide by the light source and which do not encounter any of the structures are confined within the light guide by total internal reflection;
        most light rays which are emitted into the light guide by the light source and which encounter any of the structures are redirected through the light guide toward the viewing surface and illuminating the display; and
    the structures are formed within the light guide.

2. The display as defined in claim 1, wherein the light guide is edge-lit by the light source by directing light through a corresponding edge of the light guide.

3. The display as defined in claim 1, wherein the light source comprises a number of selectably activatable light sources, the light sources extending along an edge of the light guide and configured to be individually controlled to provide uneven illumination across the light guide front surface comprising illumination which varies in intensity between adjacent selectably activatable light sources.

4. The display as defined in claim 3, wherein the light source comprises a linear array of controllable light elements extending along an edge of the light guide.

5. The display as defined in claim 3, wherein the structures cumulatively occupy less than 10% of the total surface area of the rear surface of the light guide.

6. The display as defined in claim 5, wherein the light source is a light emitting diode light source.

7. The display as defined in claim 5, wherein spacing between the structures is not the same.

8. The display as defined in claim 3, wherein the structures are of a number, size and distribution density on the rear surface of the light guide such that most ambient light rays incident on the front surface of the light guide pass through the light guide without encountering the structures.

9. The display as defined in claim 8, wherein the light guide is formed of glass or a clear plastic material.

10. The display as defined in claim 3, wherein the light source comprises a locally dimmed array of light sources.

11. The display as defined in claim 3, wherein the edges of the light guide are internally reflective.

12. The display as defined in claim 3, wherein at least one of the structures is provided for each pixel of the display.

13. The display as defined in claim 3, wherein the structures are uniformly spaced apart.

14. The display according to claim 3, wherein the selectably activatable light sources comprise a locally dimmed array of light sources at an edge of the display and wherein energization of the light sources is based at least in part on an ambient light sensor reading.

15. The display as defined in claim 14 comprising a plurality of optical intensity sensors operative to detect intensity of ambient light illumination at a plurality of regions of the display wherein the controller is operative to selectively control the locally dimmed array of light sources to emit compensating illumination distributed non-uniformly among the regions to supplement the intensity of ambient light illumination in each of the regions to attain overall uniform illumination of the viewing surface by, in each of the regions, a combination of the ambient light illumination in the region and the compensating illumination from the locally dimmed array of light sources.

16. The display as defined in claim 1, wherein the structures cumulatively occupy a small fraction of the total surface area of the rear surface of the light guide.

17. The display as defined in claim 1, wherein:
the display is operable to display an image having a plurality of regions, each of the plurality of regions having a predominant color;
the light source comprises a plurality of individually controllable light sources of different colors configured to be adjusted to illuminate regions of the light guide corresponding to the plurality of regions of the image with different colors of light according to a predominant color in each of the corresponding regions of the image to be displayed.

18. The display as defined in claim 1, wherein the output signal produced by the optical sensor further represents an intensity of ambient light rays which are scattered by any of the structures through the light guide onto the sensor; and wherein the controller is configured to:
compare the intensity of ambient light rays represented by the output signal of the optical sensor with a predefined value representative of an ambient light intensity threshold; and
activate the light source if the intensity of ambient light rays represented by the output signal produced by the optical sensor is less than the predefined value representative of the ambient light intensity threshold.

19. The display as defined in claim 18, wherein the controller is further configured to:
vary the illumination intensity of the light source in response to changes in the intensity of ambient light rays represented by the output signal produced by the optical sensor; and
deactivate the light source if the intensity of ambient light rays represented by the output signal produced by the optical sensor exceeds the predefined value representative of the ambient light intensity threshold.

20. The display as defined in claim 1, wherein the controller is configured to emit light of a chromaticity that is the same as the chromaticity represented by the output signal of the optical sensor.

21. A display method comprising:
emitting light rays from a light source;
totally internally reflecting the emitted light rays within a region substantially parallel, adjacent and overlapping a viewing surface of a display; and
at a plurality of light redirecting structures formed within a light guide throughout the region, redirecting a portion of the totally internally reflected light rays from the region toward the viewing surface, wherein
most ambient light rays incident on the region pass through the region toward the viewing surface;
sensing an intensity and a chromaticity of ambient light rays scattered within the region without being redirected toward the viewing surface;
comparing the sensed intensity with a predefined value representative of an ambient light intensity threshold; and
activating the light source to emit light having a color based at least in part on the sensed chromaticity of the ambient light rays if the sensed intensity value is less than the predefined value representative of the ambient light intensity threshold;
varying the illumination intensity of the light source in response to changes in the sensed intensity value; and
deactivating the light source if the sensed intensity value exceeds the predefined value representative of the ambient light intensity threshold.

22. A display, comprising an illuminator, the illuminator comprising:
a light guide having substantially transparent front and rear planar surfaces sized to overlap a viewing surface of the display when the planar surfaces are substantially parallel and adjacent to the viewing surface;
a light source optically coupled to emit light into the light guide; and
a plurality of light redirecting structures distributed on the rear surface of the light guide, each one of the structures shaped to redirect through the light guide toward the viewing surface light rays which encounter the structures;
wherein:
most light rays which are emitted into the light guide by the light source and which do not encounter any of the structures are confined within the light guide by total internal reflection;
most light rays which are emitted into the light guide by the light source and which encounter any of the structures are redirected through the light guide toward the viewing surface and illuminating the display, and
the structures are formed within the light guide, wherein:
the display is operable to display an image having a plurality of regions, each of the plurality of regions having a predominant color;
the light source comprises a plurality of individually controllable light sources of different colors configured to be adjusted to illuminate regions of the light guide corresponding to the plurality of regions of the image with different colors of light according to a predominant color in each of the corresponding regions of the image to be displayed.

23. A display, comprising an illuminator, the illuminator comprising:
a light guide having substantially transparent front and rear planar surfaces sized to overlap a viewing surface of the display when the planar surfaces are substantially parallel and adjacent to the viewing surface;
a light source optically coupled to emit light into the light guide;
a plurality of optical sensors operative to detect intensity of ambient light illumination at a plurality of regions of the display;
a controller connected between the plurality of optical sensors and the light source; and
a plurality of light redirecting structures distributed on the rear surface of the light guide, each one of the structures shaped to redirect toward the viewing surface light rays which encounter the structures;
wherein:
most light rays which are emitted into the light guide by the light source and which do not encounter any of the structures are confined within the light guide by total internal reflection;
most light rays which are emitted into the light guide by the light source and which encounter any of the structures are redirected through the light guide toward the viewing surface and illuminating the display, and the structures are formed within the light guide;
the light source comprises a plurality of selectably activatable light sources for supplementing available ambient light to yield a desired illumination intensity over the viewing surface; and
the controller is operative to selectively control the selectively activatable light sources to emit compensating illumination distributed non-uniformly among the regions to supplement the ambient light illumination in each of the regions to attain overall uniform illumination of the viewing surface by, in each of the regions, a combination of the ambient light illumination in the region and the compensating illumination from the light source.

* * * * *